United States Patent Office 3,038,933
Patented June 12, 1962

---

3,038,933
PROCESS FOR THE PRODUCTION OF 2-TRANS-β-IONYLIDENE ACETIC ACID
Karl Eiter, Koln-Stammheim, and Ernst Truscheit, Leverkusen, Germany, assignors to Farbenfabriken Bayer Aktiengesellschaft, Leverkusen, Germany, a corporation of Germany
No Drawing. Filed July 22, 1959, Ser. No. 828,699
Claims priority, application Germany Aug. 7, 1958
8 Claims. (Cl. 260—514)

This invention relates to a process for the production of ionylidene acetic acid and is more particularly concerned with the production of 2-trans-β-ionylidene acetic acid.

It is an object of the present invention to provide a process for the production of 2-trans-β-ionylidene acetic acid. A further object of the present invention is to provide this compound in a simple and most economic manner. A still further object of the present invention is to provide a process for the production of 2-trans-β-ionylidene acetic acid by reacting β-cyclocitral with γ-halo-β-methyl crotono nitrile. Still further objects will become apparent hereinafter.

These objects are attained in accordance with the present invention by reacting β-cyclocitral (I) with γ-halo-β-methyl crotono nitrile (II) in the presence of zinc under the conditions of the Reformatsky snythesis converting the δ-imidolactone (III) which is formed into the isomeric γ,δ-unsaturated carboxylic acid amide (IV) and saponifying this amide to 2-trans-β-ionylidene acetic acid (V). The course of the reaction is shown in the following formula diagram:

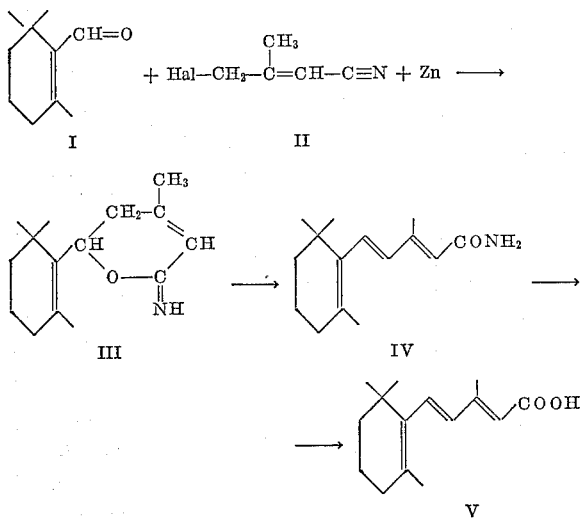

Advantageously the γ-chloro-, bromo-, and iodo-β-methyl crotono nitriles are used.

The reaction of the β-cyclocitral with the γ-halo-β-methyl crotono nitrile and zinc takes place under the conditions of the Reformatsky reaction, in that the β-cyclocitral for example is dissolved in a solvent, such as tetrahydrofuran, dioxane, benzene, toluene, or mixtures of these solvents with diethyl ether, the zinc necessary for the reaction is added in one of the usual forms, for example as powdered zinc, zinc wool or zinc chips and then the γ-halo-β-methyl crotono nitrile is added (dissolved in one of the aforementioned solvents if desired). The reaction advantageously takes place at somewhat elevated temperature, such as in the range from 40 to 110° C. The reaction can however also be so conducted that the zinc gradually has added thereto a mixture of the reaction components which may be dissolved in a solvent. To produce good yields it may be advisable to introduce the γ-halo-β-methyl crotono nitrile in excess over the β-cyclocitral. In this case, 1.2 to 1.5 mols of halogen component are used per mol of β-cyclocitral. The zinc is used in excess or in a quantity corresponding to the halogen component.

The reaction product formed by this reaction can be worked up by the usual methods of the Reformatsky synthesis, for example by treating with dilute acids, for example hydrochloric acid, sulfuric acid, phosphoric acid or acetic acid. The acid aqueous phase then contains the imidolactone dissolved as a salt, while a hydroxynitrile forming with a smaller yield can easily be extracted with ether. The salt of imidolactone can be isolated by usual methods, for example by saturating the aqueous solution with sodium chloride and extracting the salted out product by shaking with a solvent, such as methyl or ethyl formate, methyl or ethyl acetate, methylene chloride, chloroform, carbon tetrachloride, tetrahydrofuran or dioxane. The free imidolactone can be obtained from the salt by conventional methods, for example by treatment with aqueous alkalis, such as caustic soda or caustic potash solutions or solutions of potassium carbonate, sodium carbonate or sodium bicarbonate.

The reaction mixture occurring in the Reformatsky reaction can however also be worked up by treating with aqueous ammonium chloride solution. In this case, the imidolactone which is formed is obtained as a zinc-containing compound which is practically insoluble in ether and water.

The conversion of the free imidolactone into the corresponding amide can be effected by a heat treatment. This heat treatment preferably takes place in the temperature range betwen 50 and 200° C. advantageously 130 to 170° C., with exclusion of oxygen, for example under high vacuum or in an inert gas atmosphere. The amide can also be obtained by heating the free imidolactone in an inert solvent, such as benzene, toluene or xylene.

If it is not the free imidolactone which is used for the production of the amide, but the zinc containing compound obtained by working up the reaction mixture forming in the Reformatsky reaction with aqueous ammonium chloride, or the salt of imidolactone, then the amide can also be obtained from these compounds by the action of nucleophilic agents. This may be done for example by treating these compounds for some time at room temperature or somewhat elevated temperature with an alcoholic solution of caustic alkali or with alcoholate in absolute alcohol.

The corresponding unsaturated acid can be obtained from the 2-trans-β-ionlylidene acetamide by conventional saponification methods, for example by boiling for several hours with excess alcoholic caustic soda or caustic potash solutions.

All reactions preferably are carried out with exclusion of oxygen, for example in a nitrogen atmosphere. The 2-trans-β-ionlylidene acetic acid is an important intermediate product for the synthesis of Vitamin A, β-carotene and β-carotenoids.

The invention is further illustrated by the following examples without in any way limiting it thereto.

EXAMPLE 1

(a) δ-Imidolactone of 5-(2',6',6'-Trimethylcyclohexen-(1')-yl)-5-Hydroxy - 3 - Methyl - Pent-2-Enoic Acid. [6-(2',6',6' - Trimethylcyclohexen - (1') - yl)-4-Methyl-5,6-Dihydro-2-Imino-1,2-Pyrane]

In a three-necked flask fitted with a reflux condenser, thermometer, dropping funnel, stirrer and inlet pipe for nitrogen, the mixture of 15.2 g. of β-cyclocitral and 20 ml. of absolute tetrahydrofuran with 11 g. of zinc powder (preferably corroded with 2% hydrochloric acid, washed with water, ethanol, acetone and finally with absolute ether and dried in vacuo at 100° C.) is heated while stirring in a nitrogen atmosphere to about 70° C. Then the mixture of 22 g. of γ-bromo-β-methyl-crotono nitrile and 20 ml. of absolute tetrahydrofuran gradually is added dropwise while gently heating, so that the contents of the flask boil violently. The reaction temperature is 73 to 75° C. When the dropwise addition is completed and the reaction has subsided, the mixture is heated for another 15 to 20 minutes at boiling point to complete the reaction. Thereafter, the contents of the flask are cooled to about 0° C. and about 100 ml. of ether are added while stirring. While cooling externally, 200 to 250 ml. of N-hydrochloric acid are run in and the contents of the flask are transferred to a separating funnel. About 100 to 150 ml. of water are added, the mixture is thoroughly shaken, the phases are separated and the ether phase (fraction A) is extracted by again shaking twice with N-hydrochloric acid. Solid sodium bicarbonate is added to the combined aqueous phases (fraction B) at 0° C. until there is a weakly alkaline reaction. The oily reaction product separating out is extracted with ether, the ethereal solution is washed with water, dried over sodium sulfate and the ether is evaporated under reduced pressure. About 19.5 g. of 6-(2', 6',6'-trimethylcyclohexen - (1') - yl) - 4-methyl-5,6-dihydro-2-imino-1,2-pyrane (83–84% of the theoretical) are obtained as a viscous yellow oil.

The ultra-violet absorption spectrum shows the maximum at 223 mμ (ε=15,500) which is characteristic for two conjugated double bonds. The infra-red absorption spectrum has the absorption characteristic for the =N—H group at 3200 cm.$^{-1}$, the absorption characteristic for the —C=N— bond at 1660 cm.$^{-1}$ and the absorption characteristic for the —C=C— bond conjugated therewith at 1615 cm.$^{-1}$.

The ether phase (fraction A) dried over sodium sulfate leaves about 6 g. of a yellowish brown oily residue after the solvent has been evaporated under reduced pressure. This residue contains the 5-(2',6',6'-trimethylcyclohexen - (1') - yl) - 5 - hydroxy-3-methyl-pent-2-eno-1-nitrile.

(b) *Hydrochloride of the δ-Imidolactone of 5-(2',6',6'-Trimethylcyclohexen-(1')-yl)-5-Hydroxy - 3 - Methyl-Pent-2-Enoic Acid. [Hydrochloride of 6-(2',6',6'-Trimethylcyclohexen-(1')-yl) - 4 - Methyl - 5,6-Dihydro-2-Imino-1,2-Pyrane]*

The hydrochloric acid aqueous phase (fraction B) obtained after the working up of the Reformatsky mixture according to the process of Example 1a is saturated with sodium chloride and the precipitating yellow resinous product is extracted by shaking with methyl formate. The solution thus obtained is shaken several times with saturated sodium chloride solution and dried over sodium sulfate. After evaporating off the solvent under reduced pressure, there are obtained 22.5 g. of the hydrochloride of 6-(2',6',6'-trimethylcyclohexen-(1')-yl)-4-methyl-5,6-dihydro-2-imino-1,2-pyrane as a viscous resinous yellowish-brown product. Yield: 83.5% of the theoretical.

(c) *2-Trans-β-Ionylideneacetamide*

(I) 4 g. of 6-(2',6',6'-trimethylcyclohexen-(1')-yl)-4-methyl-5,6-dihydro-2-imino-1,2-pyrane are heated for 4 to 5 hours to 135 to 140° C. (oil bath temperature) at 0.08 mm. Hg in a vacuum sublimation apparatus and about 3.8 g. (=95% of the theoretical) of yellowish 2-trans-β-ionylidene acetamide are obtained. This forms as colorless crystals with a melting point of 131 to 132° C. after being recrystallised from a mixture of ether and petroleum ether.

The ultra-violet absorption spectrum shows 2 maxima at 307 mμ (ε=1300) and 250 mμ (ε=11200).

The infra-red absorption spectrum shows the absorptions at 3160, 3350 and 1615 cm.$^{-1}$ which are characteristic for the

group, the absorption at 1660 cm.$^{-1}$ which is characteristic of the —C=O— bond, the absorption at 1593 cm.$^{-1}$ which is characteristic of the —C=C— bonds which are conjugated therewith and the absorption at 972 cm.$^{-1}$ which is characteristic of the symmetrically disubstituted

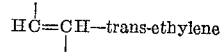

bond.

*Analysis.*—C$_{15}$H$_{23}$ON (mol. weight 233.4): Calculated: C, 77.20%; H, 9.94%; N, 6.00%. Found: C, 77.34%; H, 9.84%; N, 5.72%.

(II) 4.5 g. of the imidolactone used in Example 1c, part I, are heated to 160° C. in a round-bottomed flask for 20 minutes at 0.08 mm. Hg. After cooling, the contents of the flask solidify to a brown crystalline mass, from which 3.8 g. of 2-trans-β-ionylidene acetamide are obtained by recrystallising from a mixture of ether and petroleum ether (=84.5% of the theoretical).

(III) 4 g. of the imidolactone used in Example 1c, part I, are heated for 20 to 25 hours under reflux in 40 cc. of absolute benzene and under nitrogen with the exclusion of moisture. After evaporating the benzene under reduced pressure, the residue immediately crystallises. About 3.4 g. of 2-trans-β-C$_{15}$-amide are obtained therefrom by recrystallisation from a mixture of ether and petroleum ether (=85% of the theoretical).

(IV) The solution in 15 ml. of absolute ethanol of 5 g. of the imidolactone hydrochloride obtained by the process of Example 1 is combined at 0° C. with the solution of about 1 g. of metallic sodium in 30 ml. of absolute ethanol, whereupon a precipitate of sodium chloride is formed immediately. The mixture is left at room temperature for 5 to 12 hours and the major part of the ethanol is then evaporated off under reduced pressure. Water is added to the residue and this is extracted several times with ether. The ethereal solution is dried over sodium sulfate. After evaporating off the ether under reduced pressure and recrystallising the residue from a mixture of ether and petroleum ether, there are obtained about 2.8 g. (=65% of the theoretical) of 2-trans-β-ionylidene acetamide.

(d) *2-Trans-β-Ionylidene Acetic Acid*

5 g. of 2-trans-β-ionylidene acetamide are dissolved in 15 cc. of ethanol, the solution of 15 g. of potassium hydroxide in 10 ml. of water and 25 ml. of ethanol is added and the mixture is heated to boiling point in a nitrogen atmosphere for 20 to 25 hours under reflux. Thereafter, the alcohol is evaporated off, for the major part under reduced pressure, the residue is diluted with water, extracted by shaking once with ether and the aqueous phase is acidified at 0° C. with 10% phosphoric acid. The 2-trans-β-C$_{15}$-acid is obtained immediately in crystalline form; the precipitate is extracted with ether, the solution is dried over sodium sulfate and the ether is evaporated off. About 4.5 g. (=90% of the theoretical) of 2-trans-β-ionylidene acetic acid, which melts at 127–128° C. after being recrystallised from a mixture of ether and petroleum ether are obtained. The mixed melting point with 2-trans-β-ionylidene acetic acid which was obtained by other known processes (for example according to C. D. Robeson and Collaborators in "Journal of the American Chemical Society," vol. 77 (1955), page 4111), shows no depression.

What we claim is:

1. A process for the preparation of 2-trans-β-ionylidene acetic acid which comprises the steps of (1) refluxing β-cyclocitral in an organic solvent medium selected from the group consisting of tetrahydrofurane, dioxane, benzene, toluene and mixtures thereof with diethyl ether with γ-bromo-β-methyl crotono nitrile in the presence of zinc, in an amount of at least one mol of nitrile per mol of β-cyclocitral to produce the δ-imidolactone, (2) heating the δ-imidolactone thus produced at a temperature within the range of from about 50–200° C. in a nitrogen atmosphere, and (3) saponifying the 2-trans-β-ionylidene acetamide thus produced with a member selected from the group consisting of aqueous solutions of caustic soda, caustic potash, potassium carbonate, sodium carbonate and sodium bicarbonate to thereby produce the 2-trans-β-ionylidene acetic acid.

2. Process according to claim 1 which comprises utilizing 1.2–1.5 mols of γ-bromo-β-methylcrotono nitrile per mol of β-cyclocitral.

3. Process according to claim 1 which comprises effecting the refluxing of β-cyclocitral with γ-bromo-β-methyl-crotono nitrile at a temperature within the range of from about 40–110° C.

4. A process for the preparation of 2-trans-β-ionylidene acetic acid which comprises the steps of (1) refluxing β-cyclocitral in an organic solvent medium selected from the group consisting of tetrahydrofurane, dioxane, benzene, toluene and mixtures thereof with diethyl ether, with γ-bromo-β-methyl crotono nitrile in the presence of zinc, in an amount of at least one mol of nitrile per mol of β-cyclocitral to produce the δ-imidolactone, (2) acidifying the reaction mixture thereby formed with a dilute aqueous acid to produce the salt of δ-imidolactone, (3) isolating the thus produced salt of δ-imidolactone found in the form of its aqueous solution by saturating said solution with sodium chloride, and extracting the salted-out product with a solvent which is a member selected from the group consisting of methyl formate, ethyl formate, methyl acetate, ethyl acetate, methylene chloride, chloroform, carbon tetrachloride, tetrahydrofuran and dioxane, and (4) treating that salt so isolated with aqueous alkali to produce the 2-trans-β-ionylidene acetic acid.

5. Process according to claim 4 which comprises utilizing 1.2–1.5 mols of γ-bromo-β-methyl-crotono nitrile per mol of β-cyclocitral.

6. A process for the preparation of 2-trans-β-ionylidene acetic acid which comprises the steps of (1) refluxing β-cyclocitral in an organic solvent medium selected from the group consisting of tetrahydrofurane, dioxane, benzene, toluene and mixtures thereof with diethyl ether, with γ-bromo-β-methyl crotono nitrile in the presence of zinc, in an amount of at least one mol of nitrile per mol of β-cyclocitral, (2) treating the reaction mixture thereby formed with aqueous ammonium chloride solution to produce the δ-imidolactone as a zinc-containing compound, (3) treating the thus produced zinc-containing compound of δ-imidolactone with a member selected from the group consisting of alcoholic solutions of caustic soda and caustic potash to thereby form the 2-trans-β-ionylidene acetamide, and (4) saponifying the 2-trans-β-ionylidene acetamide thus produced with a member selected from the group consisting of aqueous solutions of caustic soda, caustic potash, potassium carbonate, sodium carbonate and sodium bicarbonate to thereby produce the 2-trans-β-ionylidene acetic acid.

7. A process for the preparation of 2-trans-β-ionylidene acetic acid which comprises the steps of (1) refluxing β-cyclocitral with γ-bromo-β-methyl crotono nitrile in a tetrahydrofurane medium in the presence of zinc and in a nitrogen atmosphere, (2) acidifying the reaction mixture thereby formed with N-hydrochloric acid to produce 6 - (2',6',6' - trimethylcyclohexen - (1') - yl) - 4-methyl-5,6-dihydro-2-imino-1,2-pyrane in the form of a salt, (3) treating the thus produced aqueous phase containing the 6-(2',6',6'-trimethylcyclohexen-(1')-yl)-4-methyl-5,6-dihydro-2-imino-1,2-pyrane in the form of its salt by saturating the aqueous solution with sodium chloride and extracting the salted-out product with methyl formate, (4) heating the thus-produced hydrochloride of 6 - (2',6',6' - trimethylcyclohexen - (1') - yl) - 4-methyl-5,6-dihydro-2-imino-1,2-pyrane with aqueous alkali, and (5) contacting the thus produced 2-trans-β-ionylidene acetamide with aqueous ethanolic potassium hydroxide to thereby produce the 2-trans-β-ionylidene acetic acid.

8. A process for the preparation of 2-trans-β-ionylidene acetic acid which comprises the steps of (1) refluxing β-cyclocitral with γ-bromo-β-methyl crotono nitrile in a tetrahydrofurane medium in the presence of zinc and in a nitrogen atmosphere, (2) heating the thus produced 6-(2',6',6'-trimethylcyclohexen(1')-yl)-4-methyl-5.6-dihydro-2-imino-1,2-pyrane, at a temperature of from 135–140° C. under vacuum to thereby produce 2-trans-β-ionylidene acetamide, and (3) saponifying the 2-trans-β-ionylidene acetamide thereby produced with aqueous ethanolic potassium hydroxide to thereby produce the 2-trans-β-ionylidene acetic acid.

References Cited in the file of this patent

UNITED STATES PATENTS 2,369,158    Milas _____ Feb. 13, 1945

FOREIGN PATENTS 1,031,787    Germany _____ June 12, 1958

OTHER REFERENCES

Noller: "Chem. of Org. Compounds," 1954, pages 240–241.